(No Model.)

G. R. PEARE.
MECHANICAL MOVEMENT.

No. 333,328. Patented Dec. 29, 1885.

Witnesses.
H. Brown
Thos. E. O'Connor.

Inventor.
Geo. R. Peare
by Knight Brown
Attys.

UNITED STATES PATENT OFFICE.

GEORGE R. PEARE, OF LYNN, MASSACHUSETTS.

MECHANICAL MOVEMENT.

SPECIFICATION forming part of Letters Patent No. 333,328, dated December 29, 1885.

Application filed June 3, 1885. Serial No. 167,484. (No model.)

*To all whom it may concern:*

Be it known that I, GEORGE R. PEARE, of Lynn, in the county of Essex and State of Massachusetts, have invented certain new and useful Improvements in Mechanical Movements, of which the following is a specification.

This invention has for its object to enable the continuous rotary and regular movement of a wheel or other rotary body to impart an intermittent or irregular rotary movement to an arbor on which said wheel is journaled; and to this end it consists in a mechanical movement composed of a rotary shaft or arbor, a wheel or collar journaled to rotate independently thereon and adapted to be continuously rotated by a suitable motor, an arm affixed to said wheel, a gear-segment pivoted to the outer end of said arm and meshing with a pinion affixed to said arbor, and a camway or groove in a fixed plate receiving a roll on the gear-segment, said camway being formed to oscillate the gear-segment independently while it is being revolved, and thereby cause it during a part of its rotation to neutralize the effect of its revolving movement on the said pinion, thus keeping the latter motionless, or nearly so, and during another part of its revolution to rotate said pinion at a velocity exceeding that of the wheel or collar, as I will now proceed to describe and claim.

Figure 1:
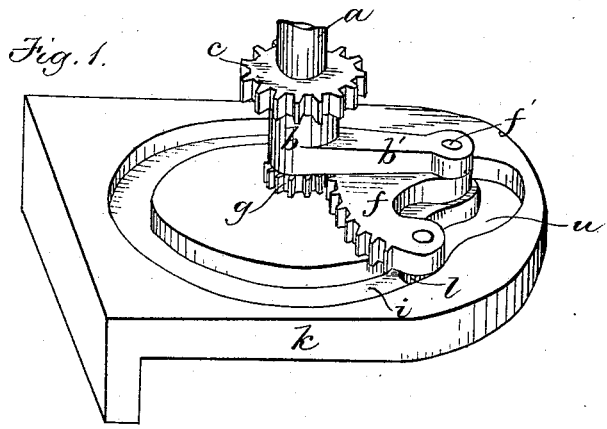
Figure 2:
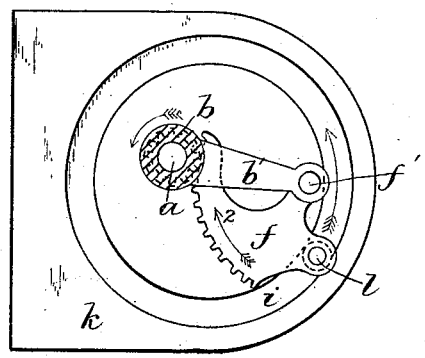
Figure 3:
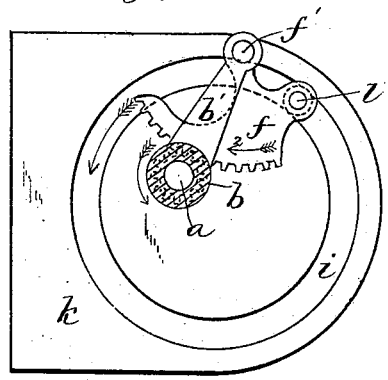
Figure 4:
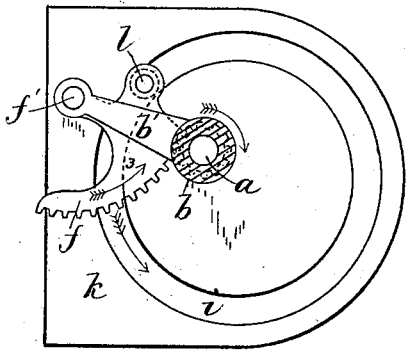
Figure 5:
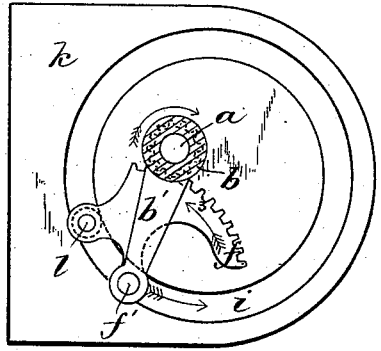

Of the accompanying drawings, forming a part of this specification, Figure 1 represents a perspective view of my improved mechanical movement. Figs. 2, 3, 4, and 5 represent plan views of the same, showing the movable parts in different positions.

The same letters of reference indicate the same parts in all the figures.

In the drawings, $a$ represents an arbor adapted to rotate freely in suitable bearings.

$b$ represents a collar or sleeve adapted to rotate freely on said arbor and provided with a pinion, $c$, or other equivalent device—such as a pulley—whereby power may be received from a suitable motor to continuously rotate said collar.

$b'$ represents an arm affixed to the collar $b$, said arm and collar constituting a crank which is revolved on the arbor $a$.

$f$ represents a gear-segment, which is pivoted at $f'$ to the outer end of the arm $b'$ and meshes with a pinion, $g$, affixed to the arbor $a$.

$i$ represents a camway or groove formed in a fixed plate on bracket $k$, and receiving a roll, $l$, pivoted to the gear-segment, said groove being eccentric to the arbor $a$.

It will be seen that the continuous rotation of the crank upon the arbor causes the gear-segment to revolve around the arbor. The form of the cam-groove is such that during a part of the revolution of the gear-segment around the arbor—viz., while the roll $l$ is traveling from the part of the groove that is farthest from the arbor $a$ to the part that is nearest said arbor—the roll $l$ will be forced inwardly by the cam-groove toward the arbor $a$, and will therefore be turned on its pivot in the direction indicated by the arrows 2 2, Figs. 2 and 3, thus rotating the pinion $g$ and its arbor $a$ in the same direction as that in which the crank is rotating, but more rapidly, the rotation of the pinion being the result of the revolving motions of the gear-segment with the crank and its independent movement on its pivot. While the roll $l$ is traveling from the part of the groove that is nearest the arbor to the point that is farthest therefrom the gear-segment is turned on its pivot in the opposite direction and rotates the pinion $g$ and its arbor $a$ backwardly with relation to the movement of the crank, as shown by the arrows 3 3, Figs. 4 and 5, thus causing the arbor and pinion to stand motionless, or nearly so. The arbor is therefore rotated irregularly or intermittently by the continuous regular rotation of the crank.

It will be seen that the mechanism whereby the above-described result is produced is very simple, and therefore not liable to become deranged.

It is obvious that the form of the cam may be variously modified to change the time, duration, and rapidity of each or either of the described swinging movements of the gear-segment. Fig. 1 shows the cam formed with an abrupt curve at $u$, to give the segment a more rapid movement on its pivot at that point.

This movement has been utilized by me as a means for operating a looper-arm attached to the arbor $a$, as shown in my pending application for Letters Patent for machine for staying layers of flexible material, and may be applied to various other purposes.

I claim—

The improved mechanical movement consisting of a crank journaled to rotate independently upon a rotary arbor, a gear-segment pivoted to said crank and meshing with a pinion on said arbor, and a camway or groove in a fixed plate receiving a stud or roll on said segment, and formed to oscillate the segment as it revolves with the crank, as set forth.

In testimony whereof I have signed my name to this specification, in the presence of two subscribing witnesses, this 25th day of May, 1885.

GEORGE R. PEARE.

Witnesses:
C. F. BROWN,
H. BROWN.